3,644,481
PLICATIC ACID ESTERS
John Howard and Terence D. McIntosh, Vancouver,
British Columbia, Canada, assignors to ITT Rayonier
Incorporated
No Drawing. Continuation-in-part of application Ser. No.
687,092, Dec. 1, 1967. This application Mar. 6, 1968,
Ser. No. 710,775
Int. Cl. C07c 69/76
U.S. Cl. 260—473 F                                       6 Claims

ABSTRACT OF THE DISCLOSURE

New compositions of matter comprising alkyl and aryl esters of plicatic acid, and the use of these esters as antioxidants for fats and oils, are disclosed.

BACKGROUND OF THE INVENTION

This is a continuation-in-part of our co-pending U.S. patent application Ser. No. 687,092, filed Dec. 1, 1967, entitled "Pure Crystalline Plicatic Acid Tetrahydrate and the Process for Making Same."

Plicatic acid has the following structure as shown by its chemical degradation products and X-ray crystallography in investigations by Gardner, Barton and MacLean, Can. J. Chem. 37, 1703–9 (1959); Gardner, MacDonald and MacLean, Can. J. Chem. 38, 2387–94 (1960 and Gardner, Swan, Sutherland and MacLean, Can. J. Chem. 44, 52–8 (1966).

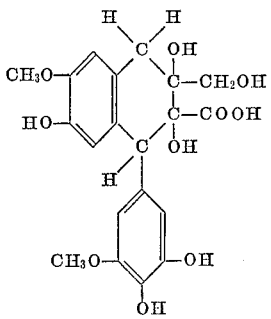

A process for the separation and recovery of plicatic acid from the aqueous extract of western red cedar is described in U.S. patent application Ser. No. 386,429 by D. W. Langille and Kenneth R. Gray, filed July 30, 1964, and a process for preparing pure crystalline plicatic acid tetrahydrate is described in our co-pending U.S. patent application Ser. No. 687,092, filed Dec. 1, 1967.

Plicatic acid is known to be a safe and effective antioxidant for edible fats and oils. Moreover, the availability of very pure crystalline plicatic acid tetrahydrate has made possible the preparation of other pure derivatives of plicatic acid of interest to manufacturers of pharmaceuticals, food antioxidants, and similar products where maximum purity, stability and reproducibility are of importance. One line of such derivatives is the esters of plicatic acid which comprise the subject matter of the present invention.

SUMMARY OF THE INVENTION

After an extensive investigation of possible procedures for preparing the esters of plicatic acid, we have prepared a large number of alkyl and aryl plicatates in crystalline and amorphous form, and we have determined the essential chemical and physical characteristics of these new compositions of matter. These esters of plicatic acid have the generic structural formula:

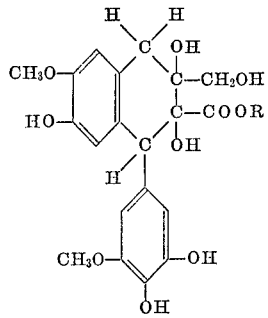

where R is an alkyl radical containing from 1 to 18 carbon atoms or an aralkyl radical containing 7 carbon atoms. Moreover, we have found, after extensive tests, that all of these alkyl and aralkyl plicatates have excellent antioxidant activity for edible fats and oils.

DETAILED DESCRIPTION

The alkyl and aralkyl plicatates of our invention have been prepared by one or more of the following methods: (1) The direct esterification of pure plicatic acid tetrahydrate with the appropriate alkyl alcohol in the presence of an acid catalyst: (2) The direct esterification of crude red cedar extracts with methyl alcohol in the presence of an acid catalyst: (3) The replacement of the methyl group in methyl plicatate with a higher alkyl group by heating with a higher alcohol in the presence of an acid catalyst; (4) The acid catalyzed alcoholysis of plicatin (the lactone of plicatic acid) with an appropriate alkyl alcohol; and (5) The reaction of potassium plicatate with an appropriate alkyl or aralkyl halide. A large number of plicatic acid esters have been prepared by the foregoing methods and the antioxidant properties of these esters have been confirmed.

The following examples are illustrative but not limitative of the preparation of the plicable acid esters of our invention.

Example 1.—Crystalline methyl plicatate

Crystalline plicatic acid tetrahydrate (4.94 g., 10 mM.) was dissolved in 25 ml. of methanol containing 2.0 ml. of concentrated sulfuric acid. The mixture was then seeded and set aside at room temperature in a stoppered flask for four days. During this time the white crystals which had deposited were removed by filtration, washed free of sulfuric acid, dried under high vacuum at 100° C. and found to weigh 3.7 g. (85% yield). The melting point was 227–30° C. with some decomposition (Leitz hot stage apparatus).

Analysis.—Calculated for methyl plicate, $C_{21}H_{24}O_{10}$ (percent): C, 57.79; H, 5.54; $OCH_3$, 21.3. Found (percent): C, 57.58; H, 5.54; $OCH_3$, 21.0.

The infra red spectrum in mineral oil showed a characteristic ester band at 1735 cm.$^{-1}$. The ester was optically active, $[\alpha]_D^{27°}$ +67.6° (C, 5 DMF). Methyl plicatate was found to be practically insoluble in water, methanol, acetone, ethyl acetate, chloroform and hydrocarbons. The only solvents in which it was found to dissolve were dimethylformamide, dimethylacetamide and dimethylsulfoxide.

Example 2.—Crystalline methyl plicatate

A solution of 4 g. of plicatin (the lactone of plicatic acid) (10 mM.) in 15 ml. of methanol containing 0.2 ml. of concentrated sulfuric acid was gently refluxed with stirring. Within 10 minutes crystalline methyl plicatate began to separate from the reaction mixture. After 4 hours the reaction mixture was cooled and the product separated and washed with a little methanol. After drying 3.5 g. of pure white material melting at 227–30° C. was obtained (80% yield). This material was identical to methyl plicatate prepared in Example 1.

Example 3.—Crystalline ethyl plicatate

Crystalline plicatic acid tetrahydrate (4.94 g., 10 mM.) was dissolved in 25 ml. of denatured ethanol (Fisher Scientific Company) containing 2 ml. of concentrated sulfuric acid. The solution was allowed to stand at room temperature in a stoppered flask for one month after which the white crystalline product was removed by filtration washed using alcohol and dried at 100° C. under high vacuum. The yield was 3.32 g. or 76%. Melting point 214–16° C. with some decomposition. The analysis calculated for ethyl plicatate $C_{22}H_{26}O_{10}$ (percent): C, 58.66; H, 5.82. Found (percent): C, 58.75; H, 5.83. The compound was optically active, $[\alpha]_D^{27}$ 77.2° (C, 5 DMF) and the infra red spectrum in mineral oil showed a characteristic ester band at 1735 cm.$^{-1}$. The product was essentially insoluble in water, methanol, ethanol, acetone, ether and hydrocarbon solvents, moderately soluble in dioxane and very soluble in dimethyl formamide, dimethyl acetamide and dimethyl sulphoxide.

Example 4.—Crystalline n-propyl plicatate

In a similar manner to that described for methyl plicatate in Example 1 crystalline n-propyl plicatate was isolated in 57% yield. The white product melted at 186–8° C. with some decomposition and analysized correctly for n-propyl plicatate. It was optically active, $[\alpha]_D^{27}$ +75.8° (C, 5 DMF and was found to be insoluble in water, but soluble in polar organic solvents such as methanol, dioxane, dimethyl formamide, slightly soluble in ether, ethyl acetate and chloroform and insoluble in hydrocarbon solvents.

Example 5.—Crystalline iso-propyl plicatate

In a similar manner to that described for methyl plicatate in Example 1 crystalline iso-propyl plicatate was isolated in 63% yield. The white product melted at 180–4° C. with some decomposition and analyzed correctly for iso-propyl plicatate. The compound was optically active $[\alpha]_D^{27}$ +73.4° (C, 5 DMF) and showed similar solubility characteristics to the n-propyl ester described in Example 5.

Example 6.—2-butyl plicatate

Crystalline potassium plicatate (40 g., 87 mM.) was dissolved in 200 ml. water and passed through a column of an ion exchange resin for a period of 2 hours. After washing residual plicatic acid from the column using 70 ml. water the eluant and washings were concentrated to a thick pale brown syrup whose weight was 46.9 g. indicating a residual amount of water still present. After dissolution of the syrupy plicatic acid in 200 ml. of 2-butanol and 50 ml. of benzene containing 2 g. of p-toluene sulfonic acid, the mixture was refluxed for a period of 4 hours. The reaction mixture was then cooled and washed with 50 ml. of water containing 4 g. sodium acetate whereupon a stubborn emulsion formed. Filtration through celite followed by addition of 25 ml. of saturated brine resulted in a slow breakdown of the emulsion and effective separation of the phases. The organic phase was then dried overnight using sodium sulfate, filtered and evaporated down under vacuo to leave 45.8 g. of dark thick syrup. The infra red spectrum showed a strong absorption at 1720 cm.$^{-1}$ for the ester carbonyl with a very weak absorption shoulder at 1785 cm.$^{-1}$ for the lactone. The hydroxyl and aromatic functions absorbed at 3450 cm.$^{-1}$ and 1615 cm.$^{-1}$ respectively.

Analysis.—Calculated for $C_{24}H_{30}O_{10}$ (percent): C, 60.25; H, 6.32. Found (percent): C, 59.2; H, 6.37.

Example 7.—Amorphous n-hexyl plicatate

A stirred suspension of 4 g. of plicatin (10 mM.) in a solution of 2 g. n-hexyl alcohol (20 mM.) in 15 ml. ethanol free chloroform containing 0.4 g. of concentrated sulfuric acid was refluxed for a total of 30 minutes. During this time all the plicatin dissolved. The reaction mixture after cooling was treated with 50 ml. of Skellysolve B whereupon the white solid that precipitated was removed by filtration and washed with a further 50 ml. of Skellysolve B. The product was then dissolved in 50 ml. of dichloromethane containing 2 ml. of methanol and washed with 50 ml. of 2% sodium acetate, 25 ml. of water and finally dried over magnesium sulfate. Removal of the magnesium sulfate and dichloromethane and final drying under high vacuum left 3 g. of white amorphous solid (59% yield). The compound was found to be homogeneous on a thin layer chromatogram using silica gel and benzene:acetone: acetic acid 10:10:1 as solvent system and iodine vapor developer.

Analyses.—Calculated for n-hexyl plicatate $C_{26}H_{34}O_{10}$ (percent): C, 61.65; H, 6.77; $OCH_3$, 12.25. Found (percent): C, 61.99; H, 7.30; $OCH_3$, 12.3. The infra red spectrum in mineral oil showed a characteristic ester band at 1735 cm.$^{-1}$. The compound was very soluble in polar organic solvents such as methanol, acetone, ethyl acetate etc. and fairly soluble in chloroform, benzene and ether while insoluble in hydrocarbon solvents.

Example 8.—Amorphous 1-dodecyl plicatate

A stirred suspension of 4 g. of plicatin (10 mM.) in a solution of 3.72 g. of 1-dodecyl alcohol (20 mM.) in 15 ml. of ethanol free chloroform containing 0.4 g. of concentrated sulfuric acid was gently refluxed for a period of 90 minutes. During this time all the plicatin had dissolved and been converted to ester. After cooling, the solution was washed with dilute brine, the chloroform phase dried over magnesium sulfate, filtered and treated with Skellysolve B to precipitate the ester as a thick syrup. Removal of the supernatant liquor by decantation and trituration of the syrup with more Skellysolve B followed by drying under high vacuum left a powdery amorphous product. Wt. 3.8 g. Further purification was effected by dissolution in hot benzene followed by addition of Skellysolve B to precipitate a white product. This was found to be homogeneous on a thin layer chromatogram using benzene:acetone:acetic acid 10:10:1 as solvent system and iodine as developer. The product showed a characteristic ester absorption at 1735 cm.$^{-1}$ in the infra red. It showed solubility in polar organic solvents but was insoluble in hydrocarbon solvents.

Example 9.—Amorphous 1-octadecyl plicatate

This compound was prepared in a similar manner to that described for 1-dodecyl plicatate in Example 8 above. The formation of emulsions during washing was however very troublesome and resulted in a less pure product as judged by thin layer chromatography.

Example 10.—Crystalline benzyl plicatate

A solution of 4.60 g. of crystalline potassium plicatate hemihydrate (9.8 mM.) in 15 ml. of dimethyl formamide containing 1.28 g. of benzyl chloride was heated to 100° C. in a stoppered flask for a period of 45 minutes. After cooling, 50 ml. of water was added and the mixture washed free of any unreacted benzyl chloride with two portions of 20 ml. each of carbon tetrachloride. The aqueous phase was then extracted with two portions of 50 ml. each of ethyl acetate. The combined ethyl acetate extracts were then backwashed using 10 ml. of water and the ethyl acetate removed under vacuum to leave 4.3 g. of pale viscous syrup which crystallized when triturated with water. A sample (1.5 g.) was further purified by dissolution in 25 ml. of ethyl acetate and passing down a small column containing 12 g. of activated silica gel. Some dark material remained at the top of the column whereas the bulk of the material was not adsorbed. Upon removal of the ethyl acetate the material crystallized upon trituration using water. The very pale pink crystals collapsed at 124–5° C. and melted at 140° C. Thin layer chromatography showed the product to be homogeneous and the infra red showed a characteristic ester absorption band at 1735 cm.$^{-1}$. The compound was optically active $[\alpha]_D^{20}+79°$ (C., 2.8 ethyl acetate).

*Analysis.*—Calculated for benzyl plicatate $C_{27}H_{28}O_{10}$ (percent): C, 63.2; H, 5.51. Found (percent): C, 62.67; H, 5.51.

The plicatic acid esters of our invention were tested to determine the antioxidant properties or activity of these compounds. The antioxidant activity was evaluated by the standard A.O.C.S. method in which the relative worth of a particular compound is determined by the number of hours it takes for a sample of a given fat or oil containing 0.01% by weight of the compound to develop a peroxide value of 100 me. per 1000 gms. of oil or fat. This value of 100 is referred to as the standard of rancidity. Tables I and II set forth the relative effectiveness of the esters of our invention, as compared with plicatin, plicatic acid and the pure substrate, as antioxidants for lard and safflower oil based on the aforementioned standards of rancidity for these substrates.

TABLE I.—Antioxidant Effectiveness in Lard

| Compound: | Time in hours to standard rancidity value (100) |
|---|---|
| n-Propyl plicatate | 37.5 |
| Iso-propyl plicatate | 37 |
| Plicatin | 36 |
| n-Butyl plicatate | 36 |
| Plicatic acid | 34.5 |
| Ethyl plicatate | 33 |
| Methyl plicatate | 32.5 |
| Benzyl plicatate | 31 |
| n-Hexyl plicatate | 30.5 |
| Dodecyl plicatate | 30.5 |
| Octadecyl plicatate | 29.5 |
| Control (pure lard) | 9 |

TABLE II.—Antioxidant Effectiveness in Safflower Oil

| Compound: | Time in hours to standard rancidity value (100) |
|---|---|
| Iso-propyl plicatate | 11 |
| n-Propyl plicatate | 10.75 |
| n-Butyl plicatate | 10.5 |
| Plicatic acid | 10.25 |
| Plicatin | 9.5 |
| Ethyl plicatate | 9.5 |
| n-Hexyl plicatate | 9.25 |
| Methyl plicatate | 9 |
| Dodecyl plicatate | 8.75 |
| Octadecyl plicatate | 8.5 |
| Control (pure safflower oil) | 6.75 |

We claim:
1. The ester of plicatic acid having the structural formula

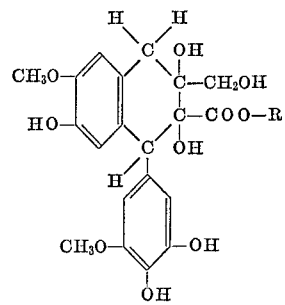

where R is an organic radical of the group consisting of alkyl radicals which contain from 1 to 18 carbon atoms and an aralkyl radical which contains 7 carbon atoms.

2. The ester of plicatic acid according to claim 1 where R is a methyl radical and the ester is methyl plicatate.

3. The ester of plicatic acid according to claim 1 where R is an ethyl radical and the ester is ethyl plicatate.

4. The ester of plicatic acid according to claim 1 where R is a propyl radical and the ester is propyl plicatate.

5. The ester of plicatic acid according to claim 1 where R is a dodecyl radical and the ester is dodecyl plicatate.

6. The ester of plicatic acid according to claim 1 where R is a benzyl radical and the ester is benzyl plicatate.

References Cited

FOREIGN PATENTS 633,569   12/1961   Canada _____ 260—473

OTHER REFERENCES

Gardner et al., Canadian Journal of Chemistry 44, pp. 52–3, (1966).

LORRAINE A. WEINBERGER, Primary Examiner

R. S. WEISSBERG, Assistant Examiner

U.S. Cl. X.R.

99—163